(12) United States Patent
Kondo

(10) Patent No.: US 7,138,198 B2
(45) Date of Patent: Nov. 21, 2006

(54) VENTILATION APPARATUS FOR FUEL CELL SYSTEM

(75) Inventor: Shugo Kondo, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 63 days.

(21) Appl. No.: 10/367,549

(22) Filed: Feb. 13, 2003

(65) Prior Publication Data
US 2003/0157384 A1    Aug. 21, 2003

(30) Foreign Application Priority Data
Feb. 15, 2002    (JP)    ............................ P2002-038956

(51) Int. Cl.
*H01M 8/04*    (2006.01)
*H01M 2/00*    (2006.01)

(52) U.S. Cl. ............................ 429/22; 429/34; 429/13; 429/26; 429/24

(58) Field of Classification Search .................. 429/22, 429/34, 13, 26
See application file for complete search history.

(56) References Cited

U.S. PATENT DOCUMENTS 6,381,156 B1 *    4/2002    Sakai et al. ................... 363/65
6,815,101 B1 *    11/2004    de Vaal et al. ................ 429/13
2003/0022045 A1 *    1/2003    Wells et al. ................... 429/26

FOREIGN PATENT DOCUMENTS

| JP | 62-285368 | 12/1987 |
| JP | 07-264715 | 10/1995 |
| JP | 08-031436 | 2/1996 |
| JP | 2001-069615 | 3/2001 |
| JP | 2001-202980 | 7/2001 |
| JP | 2002-008687 | 1/2002 |
| WO | WO-00/65679 A1 | 11/2002 |

* cited by examiner

*Primary Examiner*—Patrick Joseph Ryan
*Assistant Examiner*—Angela J. Martin
(74) *Attorney, Agent, or Firm*—Lahive & Cockfield, LLP; Anthony A. Laurentano, Esq.

(57) ABSTRACT

The present invention provides a ventilation apparatus for a fuel cell system, reliably performs ventilation of the fuel cell box after shutting down the operation of the fuel cell (when ignition is off), comprising a fuel cell box 3 housing a fuel cell 2, an extractor fan 4 for performing ventilation of the fuel cell box 3, an auxiliary battery 5 which can drive the extractor fan 4, a capacitor 7 which can drive the vehicle drive motor 6 and which can also drive extractor fan 4, a state detector 8 which detects the status of the auxiliary battery 5, and an ECU 9 connected to the state detector 8 to thereby determine the status of the auxiliary battery 5, wherein the capacitor 7 drives the extractor fan 4 under the control of the ECU 9.

4 Claims, 2 Drawing Sheets

VENTILATION APPARATUS FOR FUEL CELL SYSTEM

BACKGROUND OF THE INVENTION

1. Field of the Invention

The present invention relates to a ventilation apparatus for a fuel cell system which ventilates a fuel cell box after a fuel cell is shut down.

2. Description of the Related Art

Recently, fuel cell powered vehicles which use fuel cells for driving power are being investigated as part of a trend towards becoming practical vehicles. Fuel cells obtain power by causing an electrochemical reaction between a supplied fuel gas (such as hydrogen) and an oxidizing gas (such as air containing oxygen). For installation of the fuel cell in vehicles, a method of housing the fuel cell in a fuel cell box in order to protect the fuel cell from the outside is being investigated.

The provision of an extractor fan in the fuel cell box in order to reduce hydrogen concentration within the fuel cell box is being investigated. Because it is necessary for this extractor fan to operate even after the fuel cell power is shut down, it has been considered to drive this by means of an auxiliary battery, which drives auxiliary equipment.

However, when the auxiliary battery deteriorates so that the expected power is not obtained, there are times when the extractor fan cannot be driven sufficiently.

SUMMARY OF THE INVENTION

The present invention takes the above situation into consideration with the object of providing a ventilation apparatus for a fuel cell system comprising at least a fuel cell and a fuel cell box housing the fuel cell, and the ventilation apparatus can reliably perform ventilation of the fuel cell box after shutting down the operation of the fuel cell (when ignition is off).

In order to solve the above problem, the first aspect the present invention provides a ventilation apparatus (for example, a fuel cell box ventilation apparatus 1 referred to later in the embodiment) for a fuel cell system comprising a fuel cell (for example, a fuel cell 2 referred to later in the embodiment) and a fuel cell box (for example, a fuel cell box 3 referred to later in the embodiment) housing the fuel cell, comprising an extractor fan (for example an extractor fan 4 referred to later in the embodiment) which performs ventilation of the fuel cell box, and a storage battery (for example an auxiliary battery 5 referred to later in the embodiment), which drives the extractor fan by the storage battery to ventilate the interior of the fuel cell box for a predetermined time when power generation of the fuel cell is shut down the fuel cell power, and an abnormality detection device which detects an abnormality of the storage battery, and the extractor fan is driven by a power supply (for example a capacitor 7 referred to later in the embodiment) which backs up the storage battery, based on the abnormality detection device, to ventilate the interior of the fuel cell box.

According to the first aspect of the present invention, after shutting down the operation of the fuel cell, the storage battery drives the extractor fan and ventilates the fuel cell box. At this time, in the case where the abnormality detection device determines the status of the storage battery to be abnormal (deteriorating) with sufficient driving power not being applied to the extractor fan, the extractor fan is driven by the power supply. As a result, because it is possible to reliably drive the extractor fan regardless of the status of the storage battery, ventilation of the fuel cell box can be reliably performed.

"In the ventilation apparatus for a fuel cell system according to the second aspect of the present invention, the power supply assists the supply of power to a drive motor which is driven by the fuel cell, and also the power supply supplies power to the extractor fan through a voltage downverter device (for example a fan downverter 11 referred to later in the embodiment)."

According to the second aspect of the present invention, it is possible to provide a compact ventilation apparatus because the power device for supplying power to the motor can be also used for supplying power to the extractor fan.

"In the ventilation apparatus for a fuel cell system according to the third aspect, when an abnormality of the storage battery is detected, the abnormality status of the storage battery can be displayed when the fuel cell is activated."

According to the third aspect of the present invention, the driver of the vehicle is aware of the necessity of the maintenance and replacement of the storage battery, so that the safety of the fuel cell vehicle can be further improved.

DETAILED DESCRIPTION OF THE INVENTION

"Hereunder a ventilation apparatus for a fuel cell system according to an embodiment of the present invention will be described, together with drawings."

Figure 1:
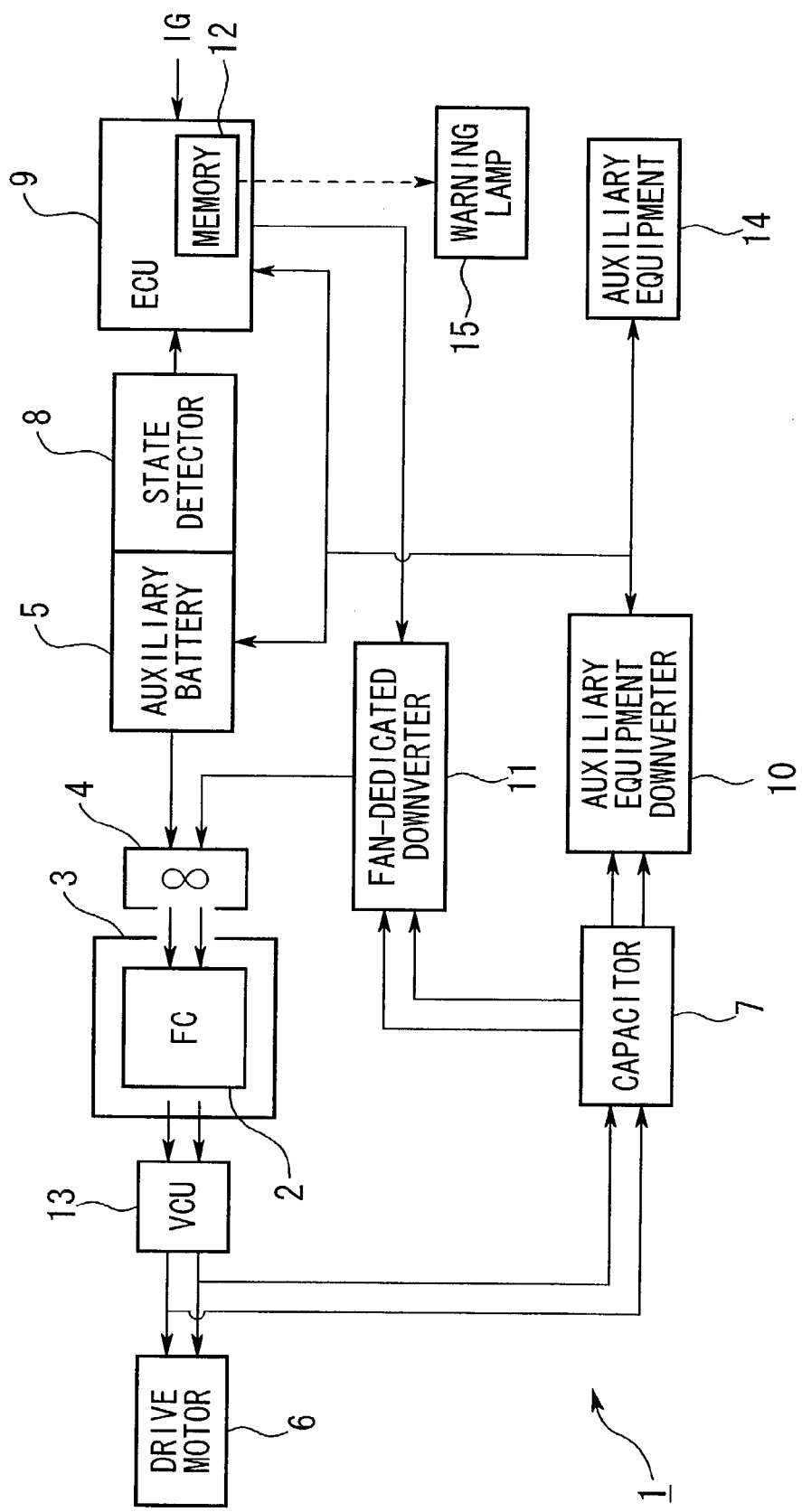
FIG. 1 is a schematic diagram showing a fuel cell box ventilation apparatus of an embodiment of the present invention.

FIG. 1 is a schematic diagram showing a fuel cell box ventilation apparatus 1 (hereunder referred to as ventilation apparatus 1) of one embodiment of the present invention. A vehicle equipped with this ventilation apparatus 1 is provided with a fuel cell (FC) 2. This fuel cell 2 is housed within a fuel cell box 3, and driving power is obtained by causing an electrochemical reaction of supplied reaction gases (fuel gas and oxidizing gas, neither shown in the figure). An extractor fan 4, which performs ventilation of the fuel cell box 3, is provided in the fuel cell box 3 which houses the fuel cell 2. This extractor fan 4 will be described in more detail later.

The fuel cell 2 is connected to a drive motor 6 through a VCU 13, so that driving power of the fuel cell 2 is supplied to the drive motor 6. As a result, rotary drive of the drive motor 6 becomes possible. Furthermore, to the drive motor 6 is connected a capacitor 7 in parallel with the fuel cell 2. The capacitor 7 is charged by the generated output of fuel cell 2 up to the same output as fuel cell 2, and can assist the fuel cell 2 during acceleration of the vehicle to drive the drive motor 6, and during regeneration is charged by regenerative electric power from the drive motor 6. According to the embodiment of the present invention, a rapid response to output demand is made possible due to the use of the capacitor 7 as a drive storage battery.

The capacitor 7 is connected to an ECU (control unit) 9 and to auxiliary equipment 14 through an auxiliary equipment downverter 10. Power supplied from the capacitor 7 has the voltage thereof (the fuel cell voltage) stepped down by the auxiliary equipment downverter 10 to a voltage which is suitable for the ECU 9 and the auxiliary equipment 14 (for example 12V) and is then supplied to the ECU 9 and the auxiliary equipment 14. The auxiliary equipment downverter 10 is also connected to an auxiliary battery 5, and also supplies power stepped down as mentioned above to the auxiliary battery 5. In this way the auxiliary battery 5 is charged. The auxiliary battery 5 is connected to the extractor fan 4, and supplies drive power to the extractor fan 4 when the fuel cell 2 is shut down.

Also, the capacitor 7 is connected to the extractor fan 4 through a fan-dedicated downverter 11. Power supplied from the capacitor 7 is stepped down by the fan-dedicated downverter 11 in the same manner as mentioned above for the auxiliary equipment downverter 10, and then supplied to the extractor fan 4.

Figure 2:
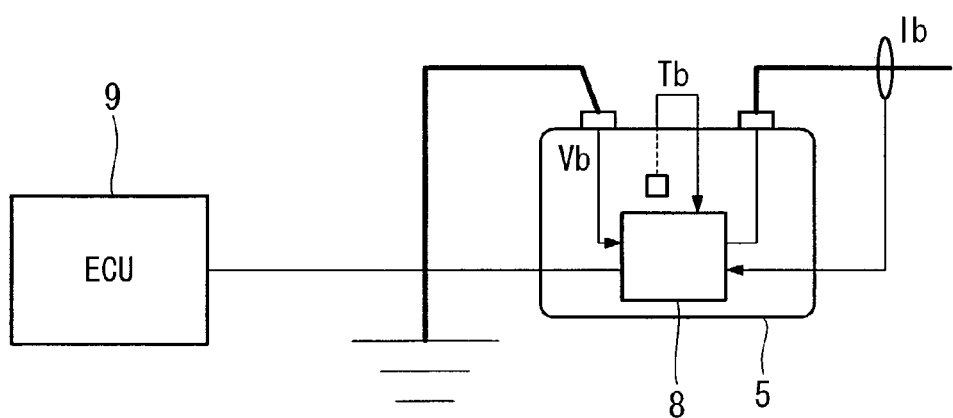
FIG. 2 is a block diagram showing the auxiliary battery and the state detector of FIG. 1 in more detail.

A state detector 8, which detects the status of the auxiliary battery 5, is provided in the auxiliary battery 5. FIG. 2 is a block diagram showing the auxiliary battery 5 and the state detector 8 of FIG. 1 in more detail. As shown this figure, the state detector 8 is configured so as to be able detect a temperature Tb, a power current Ib, and an output voltage Vb of the auxiliary battery 5. Moreover, the state detector 8 is connected to the ECU 9. The ECU 9 determines whether the status of the auxiliary battery 5 is normal or abnormal, based on the status detected by the state detector 8. Then, the ECU 9 controls the fan-dedicated downverter 11 and the auxiliary equipment downverter 10, based on the results thus determined. This will be explained later.

Inside the ECU 9 is provided a memory 12 which is able to store the status of the auxiliary battery 5. Moreover, the ECU 9 is connected to an auxiliary battery warning lamp 15, and this warning lamp 15 lights up according to the contents stored in the memory 12. According to the embodiment of the present invention, the warning lamp 15 is controlled to light up when an abnormal status of the auxiliary battery 5 is stored in the memory 12.

The operation of the fuel cell box ventilation apparatus 1 as configured above is as follows. That is to say, when an IG (ignition) switch is turned off, the power of the fuel cell 2 is shut down, and also, for a predetermined time (for example 60 seconds), the extractor fan 4 is driven by the auxiliary battery 5, to perform ventilation of the fuel cell box 3. At this time, when, based on the detection result of the state detector 8, the ECU 9 determines the status of the auxiliary battery 5 to be abnormal (deteriorating) with sufficient driving power not being applied to the extractor fan 4, the extractor fan 4 is driven by the capacitor 7. That is to say, the ECU 9 controls the fan-dedicated downverter 11 to supply the power from the capacitor 7 to the extractor fan 4 through the fan-dedicated downverter 11. Moreover, the ECU 9 controls the auxiliary equipment downverter 10 to shut down the power supply from the capacitor 7 to the auxiliary equipment 14 and the like. Because the capacitor 7 is connected through the downverter exclusively used for the fan, the power from the capacitor 7 can be prevented from being supplied to auxiliary equipment other than the extractor fan 4.

Furthermore, when the auxiliary battery 5 is determined to be an abnormal state, this is stored in the memory 12 of the ECU 9. Then, the next time the IG switch is turned on to operate the fuel cell 2, the contents of the memory 12 indicates the status of the auxiliary battery 5 by the warning lamp 15. Consequently, the driver of the vehicle is aware of the necessity of the maintenance and replacement of the auxiliary battery 5, so that the safety of the fuel cell vehicle can be further improved. In this way, because it is possible to reliably drive the extractor fan regardless of the status of the auxiliary battery 5, ventilation of the fuel cell box 3 can be reliably performed.

The above embodiment has described the case where the driving power storage battery is a capacitor, but the present invention is not limited to this, and a battery may be used. Also, other modifications may of course be made, within a scope not departing from the gist of the invention.

As explained above, according to the first aspect of the present invention, because it is possible to reliably drive the extractor fan regardless of the status of the storage battery, ventilation of the fuel cell box can be reliably performed.

According to the second aspect of the present invention, it is possible to produces a compact ventilation apparatus because the power supply for the motor can be also used for supplying power to the extractor fan.

According to the third aspect of the present invention, the driver is able to be aware of the necessity of the maintenance and replacement of the storage battery by the driver, so that the safety of the fuel cell vehicle can be further improved.

What is claimed is:

1. A ventilation apparatus for a fuel cell system comprising at least a fuel cell and a fuel cell box housing the fuel cell, the ventilation apparatus comprising:
   an extractor fan which performs ventilation of said fuel cell box;
   a storage battery which drives the extractor fan to ventilate the interior of the fuel cell box for a predetermined time when power generation by the fuel cell is shut down; and
   an abnormality detection device which detects an abnormality of said storage battery; and
   a power supply which supply which assists said storage battery to drive said extractor fan,
   wherein said extractor fan is driven by said power supply when power generation by the fuel cell box is shut down or when an abnormality of said storage battery is detected by said abnormality detection device.

2. A ventilation apparatus for a fuel cell box according to claim 1, wherein said power supply assists the supply of power to a drive motor which is driven by said fuel cell, and said power supply also supplies power to the extractor fan through a voltage downverter device.

3. A ventilation apparatus for a fuel cell system box according to claim 1, wherein when an abnormality of said storage battery is detected, the abnormality status of said storage battery can be displayed when said fuel cell is activated.

4. A ventilation apparatus for a fuel cell box system according to claim 2, wherein when an abnormality of said storage battery is detected, the abnormality status of said storage battery can be displayed when said fuel cell is activated.

* * * * *